United States Patent [19]
Ohtake

[11] Patent Number: 5,687,403
[45] Date of Patent: Nov. 11, 1997

[54] FOCAL POINT POSITION CORRECTION APPARATUS

[75] Inventor: Motoyuki Ohtake, Kawasaki, Japan

[73] Assignee: Nikon Corporation, Tokyo, Japan

[21] Appl. No.: 598,265

[22] Filed: Feb. 7, 1996

[30] Foreign Application Priority Data

Apr. 13, 1995 [JP] Japan .................. 7-112377

[51] Int. Cl.$^6$ .................. G03B 1/18
[52] U.S. Cl. .................. 396/82; 396/80; 396/81; 396/87
[58] Field of Search .................. 354/195.12; 359/676, 359/422; 396/79, 80–82, 85, 87

[56] References Cited

U.S. PATENT DOCUMENTS

| | | | |
|---|---|---|---|
| 4,914,464 | 4/1990 | Azuma et al. | 354/400 |
| 5,078,481 | 1/1992 | Nakayama et al. | 359/676 |
| 5,122,826 | 6/1992 | Kodaka | 354/195.12 |
| 5,191,476 | 3/1993 | Sato | 359/676 |
| 5,202,992 | 4/1993 | Banno et al. | 359/676 |
| 5,241,420 | 8/1993 | Yamanashi | 359/676 |
| 5,285,317 | 2/1994 | Uzawa | 359/676 |
| 5,301,064 | 4/1994 | Sugi et al. | 359/676 |
| 5,414,562 | 5/1995 | Ueda | 359/676 |
| 5,416,639 | 5/1995 | Yamanashi | 359/676 |
| 5,442,485 | 8/1995 | Yamanashi | 359/676 |

*Primary Examiner*—Safet Metjahic
*Assistant Examiner*—Michael Dalakis
*Attorney, Agent, or Firm*—Shapiro and Shapiro

[57] ABSTRACT

A focal point position correction apparatus for a camera with a zoom lens system, has an adjustment amount calculation device for calculating an adjustment amount δh of at least one lens unit Gh in the zoom lens system using a formula based on focal length information that defines a change amount corresponding to the focal length of the entire lens system and correction coefficients pre-stored for back focus adjustment, and a lens unit driver for moving the lens unit Gh by the adjustment amount δh along the optical axis in the respective focal length states so as to correct any deviation, of the focal point position with respect to the film surface of a best image surface, caused by manufacturing errors, over the entire zooming range.

12 Claims, 10 Drawing Sheets

FOCAL POINT POSITION CORRECTION APPARATUS

BACKGROUND OF THE INVENTION

1. Field of the Invention

The present invention relates to a focal point position correction apparatus and, more particularly, to a focus point position correction apparatus for correcting any deviation of the focal point position generated in the manufacture of a zoom lens system for a camera.

2. Related Background Art

As a recent tendency of cameras, cameras with zoom lenses are becoming mainstream cameras.

As cameras with zoom lenses become mainstream ones, various proposals associated with zoom lenses which attain an increase in zoom ratio and high performance have been made. In particular, cameras with zoom lenses which attain an increase in zoom ratio using a so-called multi-unit zoom type constituted by three or more movable lens units have become popular.

Normally, a lens is manufactured to have given allowable errors (tolerances) with respect to specific design values of various parameters such as the radius of curvature, distance between surfaces, refractive index, dispersion, and the like. More specifically, lenses constituting a zoom lens system are manufactured to have variations limited on the basis of the tolerances of the respective parameters. As a result, the manufactured zoom lens system has certain deviation amounts with respect to the design values of its focal length and back focus.

In the case of the zoom lens system, the focal length and principal point position of each lens unit suffer manufacturing errors. In addition, since each lens unit moves along a predetermined cam locus in a zooming operation, the focal point position changes during zooming. In order to prevent these problems, an operation for matching the film surface position with the focal point position over the entire zooming range is required in the manufacturing process. This operation is called "back focus adjustment".

In general, in a zoom lens system constituted by N movable lens units, even when the focal point position and the film surface position are matched at the wide-angle and telephoto ends, the focal point position changes along an Nth-degree curve between the wide-angle and telephoto ends, as is well known.

The deviation of the focal point position generated in the manufacture of a zoom lens system will be described below using a low-profile lens system shown in FIGS. 9A and 9B.

A zoom lens system shown in FIGS. 9A and 9B is a front focus (FF) type, two-unit zoom lens system which attains near-distance focusing by moving a first lens unit G1 disposed at a position closest to the object side, and consists of two lens units, i.e., positive and negative lens units. The deviation of the back focus caused by a change in focal length will be described below using this two-unit zoom lens system.

FIG. 9A shows the refractive power arrangement in design, and FIG. 9B shows the refractive power arrangement in the manufacture. Note that FIGS. 9A and 9B illustrate a first lens unit G1 as a lens unit which is disposed at the object side, and a second lens unit G2 as a lens unit which is disposed at the image side.

Let f1 be the focal length of the first lens unit G1 in design, and f2 be the focal length of the second lens unit in design. Let f1+Δf1 be the focal length of the first lens unit G1 in the manufacture, and f2+Δf2 be the focal length of the second lens unit in the manufacture. In this case, in design, the focal point position matches the film surface in the range from the wide-angle end (W) to the telephoto end (T). On the contrary, in the manufacture, the focal point positions at the Wide-angle end (W) and the telephoto end (T) respectively deviate by σw and σt from the film surface.

An operation required for matching the focal point position and the film surface at the wide-angle and telephoto ends will be described in detail below with reference to FIGS. 10A and 10B. The back focus adjustment is attained by operations shown in FIGS. 10A and 10B.

In the operation shown in FIG. 10A, the first lens unit G1 is moved by $\delta_0$ so that the focal point position at the wide-angle end is matched with that at the telephoto end. Then, in the operation shown in FIG. 10B, the entire lens system is moved by $\delta_0'$ so that the focal point positions match the film surface both at the wide-angle and telephoto ends.

In the operation shown in FIG. 10A, the moving amount, σ, of the focal point position upon movement of the first lens unit G1 by δ in the optical axis direction is given by the following equation (1):

$$\sigma = a \cdot \delta = \beta_2^2 \cdot \delta \tag{1}$$

where a: coefficient $\beta_2$: use magnification of second lens unit G2

The use magnification $\beta_2$ of the second lens unit assumes different values at the wide-angle and telephoto ends. For this reason, when the first lens Unit G1 is moved by δ, the focal point position has different moving amounts at the wide-angle and telephoto ends. More specifically, by utilizing the difference between the different moving amounts of the focal point positions at the wide-angle and telephoto ends, the focal point position at the wide-angle end can be matched with that at the telephoto end.

In practice, in the manufacture, not only a deviation of the focal length but also a deviation of the principal point position are generated simultaneously in each lens unit. However, since a deviation of the principal point position of each lens unit consequently produces a deviation of the focal point position of the zoom lens system, the back focus adjustment for the deviation of the principal point position at the wide-angle and telephoto end can be realized by the same operation as that for the deviation of the focal length.

The relationship between the movements of respective lens units and the movement of the image surface position after the back focus adjustment at the wide-angle and telephoto ends will be described below with reference to FIG. 11.

As shown in FIG. 11, even when the focal point positions are matched with the film surface respectively at the wide-angle and telephoto ends, when each lens unit moves along a cam locus upon zooming, the focal point position does not match the film surface during zooming from the wide-angle end to the telephoto end. Since the illustrated zoom lens system is constituted by two movable lens units (i.e., a two-unit arrangement), the focal point position changes along a quadratic curve between the wide-angle and telephoto ends.

When the zoom ratio of the zoom lens system is small, a maximum deviation amount δBf of the focal point position is small. However, as the zoom ratio of the zoom lens system becomes larger, the maximum deviation amount δBf of the focal point position increases. As a result, a so-called defocus state occurs in a middle focal length state between the wide-angle and telephoto end, thus disturbing a satisfactory photographing operation.

Therefore, the deviation of the focal point position (best image surface) with respect to the film surface must be corrected in respective focal length states between the wide-angle and telephoto ends. Thus, the first lens unit G1 as a focusing lens unit is moved by an adjustment amount $\delta h$ to correct the deviation of the focal point position. FIG. 12 shows a change in adjustment amount $\delta h$ upon zooming, which amount is required for correcting the deviation of the focal point position with respect to the film surface between the wide-angle and telephoto ends.

In a conventional back focus adjustment method, as shown in FIG. 13, the focal length range from the wide-angle end to the telephoto end is divided into a plurality of small ranges, and approximate adjustment amounts of the focusing lens unit are stored in units of focal length ranges. More specifically, as indicated by a broken curve in FIG. 13, with respect to an actual strict adjustment amount which changes continuously in correspondence with a change in focal length, a central strict adjustment amount at the center of a focal length range of interest is used as an approximate adjustment amount for the focal length range of interest, as indicated by a solid line in FIG. 13. Based on the stored approximate adjustment amounts, the focusing lens unit is controlled stepwise in units of focal length ranges, thus reducing the deviation between the focal point position and the film surface.

In a conventional back focus adjustment method disclosed in Japanese Patent Application Laid-open No. 1-201633, as shown in FIG. 14, actual strict adjustment amounts of the focusing lens unit in a plurality of representative focal length states are directly stored. At a focal length between the i-th and (i+1)-th representative focal length states, an approximate adjustment amount (indicated by a solid line in FIG. 14) in the corresponding focal length state is calculated by performing a linear interpolation on the basis of strict adjustment amounts $\delta h_i$ and $\delta h_{i+1}$ in the i-th and (i+1)-th representative focal length states. The focusing lens unit is controlled based on the calculated approximate adjustment amount in each focal length state, thereby reducing the deviation between the focal point position and the film surface.

However, as described above, in a multi-unit zoom lens system consisting of N movable lens units, the focal point position changes along an Nth-degree curve. Therefore, when the conventional back focus adjustment method shown in FIG. 13 is applied to a multi-unit zoom lens system, the focal point position deviates considerably in a specific zoom region. In order to avoid considerable deviation of the focal point position, the focal length range from the wide-angle end to the telephoto end must be divided into a very large number of small ranges. As a result, a very large storage capacity is required to store approximate adjustment amounts in correspondence with a very large number of divided focal length ranges.

As can be seen from FIGS. 13 and 14, the back focus adjustment method of Japanese Patent Application Laid-open No. 1-201633 shown in FIG. 14 can reduce the deviation of the focal point position of the two-unit zoom lens system as compared to the conventional back focus adjustment method shown in FIG. 13. However, in a multi-unit zoom lens system with a high zoom ratio, as indicated by broken curves in FIGS. 15 and 16, the strict adjustment amount changes largely depending on the focal length.

For this reason, even when the back focus adjustment method of Japanese Patent Application Laid-open No. 1-201633 shown in FIG. 14 is applied to a multi-unit zoom lens system with a high zoom ratio, the focal point position considerably deviates in a specific zoom region. In order to avoid considerable deviation of the focal point position, adjustment amounts in a very large number of representative focal length states must be stored in the focal length range from the wide-angle end to the telephoto end.

SUMMARY OF THE INVENTION

The present invention has been made in consideration of the above situation, and has as an object to provide a focal point position correction apparatus for a camera with a zoom lens, which apparatus can satisfactorily correct any deviation of the focal point position caused by manufacturing errors with a small storage capacity.

In order to achieve the object, according to the present invention, there is provided a focal point position correction apparatus for a camera with a zoom lens system, comprising adjustment amount calculation means for calculating an adjustment amount $\delta h$ of at least one lens unit Gh in the zoom lens system using a formula based on focal length information that defines a change amount corresponding to a focal length of the entire lens system and correction coefficients pre-stored for back focus adjustment, and driving means for moving the lens unit Gh by the adjustment amount $\delta h$ along an optical axis in respective focal length states so as to correct a deviation, of a focal point position with respect to a film surface of a best image surface, caused by manufacturing errors, over an entire zooming range.

According a preferred aspect of the present invention, the lens unit Gh has a variable use magnification upon zooming and is movable upon focusing.

The adjustment amount calculation means preferably calculates the adjustment amount $\delta h$ using a formula below based on correction coefficients $a_0, a_1, a_2, \ldots, a_i$ and a change amount $\Delta$ as the focal length information:

$$\delta h = a_0 + a_1\Delta + a_2\Delta^2 + \ldots + a_i\Delta^i$$

A general discussion associated with a so-called multi-unit zoom lens system consisting of three or more movable lens units will be given below.

In a multi-unit zoom lens system, since the degree of freedom of choice of the zooming locus of each lens unit upon zooming from the wide-angle end to the telephoto end increases, the degree of freedom upon aberration correction increases. Also, since the number of lens units associated with zooming increases, it becomes easy to make uniform the zooming load on each lens unit. Therefore, both a high zoom ratio and high performance can be attained simultaneously.

Note that a problem associated with a complex lens barrel structure due to an increase in the number of movable portions is known. However, recent advances in the lens barrel technology can overcome this problem to some extent.

A back focus adjustment method according to the present invention will be explained below while taking, as an example, a multi-unit zoom lens system that attains focusing according to a front focus (FF) method, and performs adjustment so that the focal point position matches the film surface over the entire zooming range by moving a focusing lens unit.

Assume that a first lens unit as the focusing lens unit monotonously moves in one direction upon zooming, and the focal length of the zoom lens system is uniquely determined by the moving amount upon zooming.

As described above, the back focus adjustment is mainly attained by two operations. In the first operation, one of lens units constituting the zoom lens system is moved, so that the focal point position at the wide-angle end matches that at the telephoto end. After the first operation, some deviation of the focal point position remains in the respective focal length states between the wide-angle and telephoto ends. As described above, in a multi-unit zoom lens system consisting of N movable lens units, the focal point position changes along an Nth-degree curve.

More specifically, the deviation amount, $\delta Bf$, of the focal point position is expressed by a polynomial like equation (2) below, depending on the moving amount, $\Delta$, upon zooming of the first lens unit as the focusing lens unit from its reference position:

$$\delta Bf = b_0 + b_1\Delta + b_2\Delta^2 + \ldots + b_N\Delta^N \tag{2}$$

where $b_i$: coefficient

Let f1 be the focal length of the first lens unit and f be the focal length of the entire lens system. Then, a total use magnification $\beta$ of the lens units arranged on the image side of the first lens unit is given by equation (3) below:

$$\beta = f/f1 \tag{3}$$

From the relationship given by equation (3), the coefficient a in equation (1) above is given by equation (4) below:

$$a = (f/f1)^2 \tag{4}$$

As described above, the focal length f of the entire lens system is uniquely determined by the moving amount $\Delta$ of the first lens unit upon zooming. More specifically, the focal length f can be expressed by approximation using a polynomial like equation (5) below:

$$f = c_0 + c_1\Delta + c_2\Delta^2 + \ldots \tag{5}$$

Therefore, a square of the focal length f can similarly be expressed by approximation using a polynomial like equation (6) below:

$$f^2 = c'_0 c'_1\Delta + c'_2\Delta^2 + \ldots \tag{6}$$

If equation (6) is substituted in equation (1), the moving amount $\sigma$ of the focal point position is given by equation (7) below:

$$\sigma = \{(c'_0 + c'_1\Delta + c'_2\Delta^2 + \ldots)/f1^2\}\cdot\delta \tag{7}$$

When the first lens unit is moved so that the moving amount $\sigma$ of the focal point position given by equation (7) cancels the deviation amount $\delta Bf$ of the focal point position given by equation (2), the deviation of the focal point position can be adjusted. Then, $\delta$ at that time, i.e., the moving amount $\delta$ that can adjust the deviation of the focal point position, is assumed to be the adjustment amount $\delta h$.

More specifically, assuming that the sum total of the right-hand sides of equations (2) and (7) is zero, the relationship given by equation (8) below can be obtained:

$$g(\Delta) = \{h(\Delta)/f1^2\}\cdot\delta h \tag{8}$$

for $$g(\Delta) = b_0 + b_1\Delta + b_2\Delta^2 + \ldots + b_N\Delta^N$$

$$h(\Delta) = c'_0 + c'_1\Delta + c'_2\Delta^2 + \ldots$$

On the other hand, modification of equation (8) yields equation (9) below:

$$\delta h = \{g(\Delta)/h(\Delta)\}\cdot f1^2 \tag{9}$$

In equation (9), $g(\Delta)/h(\Delta)$ can be expressed by approximation using an Nth-degree formula in $\Delta$. Therefore, the adjustment amount $\delta h$ is expressed by approximation using equation (10) below:

$$\delta h = d_0 + d_1\Delta + d_2\Delta^2 + \ldots + d_N\Delta^N \tag{10}$$

As described above, the adjustment amount $\delta h$ can be calculated using equation (10) based on the correction coefficients $d_0$, $d_1$, $d_2$, ..., $d_N$, and the moving amount $\Delta$ of the first lens unit upon zooming as the focal length information. The first lens unit as the focusing lens unit is moved by the calculated adjustment amount $\delta h$, thereby correcting the deviation of focal point position with respect to the film surface as the best image surface due to manufacturing errors over the entire zooming region.

Based on the above discussion, according to the present invention, the correction coefficients $d_0$, $d_1$, $d_2$, ..., $d_N$ in equation (10) are stored in a memory in a camera main body. Then, the adjustment amount $\delta h$ is calculated using equation (10) based on the moving amount A of the first lens unit upon zooming and the stored correction coefficients. By moving the first lens unit by the calculated adjustment amount $\delta h$, the deviation of the focal point position can be adjusted. More specifically, the deviation of the focal point position can be adjusted by storing only (N+1) correction coefficients, i.e., with a small storage capacity.

In the above description, the moving amount of the first lens unit upon zooming is used as focal length information which specifies the change amount corresponding to the focal length of the zoom lens system. However, the focal length information is not limited to the moving amount of the first lens unit upon zooming. For example, if a lens unit monotonously moves in one direction upon zooming and the focal length is uniquely determined by its moving amount upon zooming like a variator in a four-unit afocal type lens system, the moving amount of this lens unit upon zooming can be used as the focal length information.

In the above discussion, the effect of the present invention for the front focus (FF) method has been described. The back focus adjustment method according to the present invention for a focusing method other than the front focus (FF) method will be explained below.

A general discussion of the focusing methods of zoom lens systems will be given below.

In a zoom lens system, in order to simplify the lens barrel structure, a focusing method for moving a lens unit as a portion of a lens system in a focusing operation is popular. When the front focus (FF) method is used, since the first lens unit, which is disposed at a position closest to the object side and has a large lens diameter, serves as a focusing lens unit, the driving mechanism tends to become bulky and complicated. In order to prevent this problem, many proposals have been made about a focusing method which can simplify the lens barrel structure by moving a lens unit which is disposed on the image side of the first lens unit and has a small lens diameter.

A focusing method for moving a lens unit disposed at the image side of the first lens unit is roughly classified into an inner focus (IF) method and a rear focus (RF) method.

In the front focus (FF) method, the extension amount with respect to a predetermined photographing distance is constant over the entire zooming range like in, e.g., a four-unit afocal zoom lens system. In contrast to this, in the inner focus (IF) or rear focus (RF) method, since the use magnification of the focusing lens unit changes upon zooming, the extension amount with respect to an identical photographing distance changes upon zooming.

As described above, when the inner focus (IF) or rear focus (RF) method is used, the use magnification of the focusing lens unit changes upon zooming from the wide-angle end to the telephoto end. Therefore, the extension amount with respect to an identical photographing distance changes upon zooming, and it is difficult to control the driving operation of the focusing lens unit. In particular, it is not easy for a non-TTL type camera which does not allow confirmation of the imaging state on the film surface to control the focusing lens unit. Thus, a method in which the focal length range from the wide-angle end to the telephoto end is divided into a plurality of small ranges, and identical control is made independently of the focal length in each of divided focal length ranges is generally used.

As cameras with an auto-focus function have become popular in recent years, the auto-focus speed has increased and in particular, a proposal associated with a focusing method with a small work amount (=weight×moving amount) has been made.

A condition for reducing the moving amount of the focusing lens unit will be described below.

When the position of an object moves from a far distance to a near distance, the focusing operation is attained by moving the focusing lens unit so that the position of an image point formed by the focusing lens unit becomes constant.

The condition for reducing the moving amount of the focusing lens unit at that time will be described below with reference to a low-profile lens system shown in FIG. 1.

Referring to FIG. 1, F indicates the position of the focusing lens unit in a far-distance in-focus state, and F' indicates the position of the focusing lens unit in a near-distance in-focus state. In addition, A indicates the position of an object point with respect to the focusing lens unit in the far-distance in-focus state, and B indicates the position of an image point formed by the focusing lens unit in the far-distance in-focus state.

Also, A' indicates the position of an object point with respect to the focusing lens unit in the near-distance in-focus state, and B' indicates the position of an image point formed by the focusing lens unit in the near distance in-focus state. As shown in FIG. 1, when the object position moves from a far distance to a near distance, the focusing lens unit moves by x along the optical axis, so that the position B' of the image point formed by the focusing lens unit maintains the original image point position B, thus attaining near-distance focusing.

As described above, when the position of the object point with respect to the focusing lens unit moves by y from A to A', the focusing lens unit is moved by x from F to F' to make the image point position by the focusing lens unit constant. In this case, let $\beta f$ be the imaging magnification of the focusing lens unit. Then, the moving amount x of the focusing lens unit is given by equation (11) below:

$$x = \{\beta f^2/(\beta f^2 - 1)\} \cdot y \tag{11}$$

Assuming $k = \beta f^2/(\beta f^2 - 1)$ in equation (11), the value k satisfies one of inequalities (12) and (13) below depending on the value $\beta f^2$:

$$1 \leq k (\beta f^2 > 1) \tag{12}$$

$$0 > k (\beta f^2 < 1) \tag{13}$$

Therefore, in order to reduce the moving amount x of the focusing lens unit, in the case of (i) $\beta f^2 > 1$, k must be set to be close to 1, i.e., $1/\beta f$ must be set to be close to 0; in the case of (ii) $\beta f^2 < 1$, k must be set to be close to 0, i.e., $\beta f$ must be set to be close to 0. According to the present invention, the moving amount x of the focusing lens unit upon focusing is reduced by setting $\beta f$ to be close to 0.

In a zoom lens system of the IF or RF method, if the use magnification of the focusing lens unit represented by $\beta f$, the moving amount, $\sigma$, of the image surface upon movement of the focusing lens unit by $\delta$ is given by equation (14) below:

$$\sigma = \delta \cdot (\beta f^2 - 1) \beta^2 \tag{14}$$

where $\beta$ is the total use magnification of lens units disposed at the image side of the focusing lens unit. On the other hand, if the synthesized focal length of the lens units disposed at the object side of the focusing lens unit is represented by f', the focal length f is given by equation (15) below:

$$f = \beta f \cdot \beta \cdot f' \tag{15}$$

As described above, in the focusing lens unit, (i) $\beta f^2$ is almost zero or (ii) $1/\beta f^2$ is almost zero.

Therefore, when $\beta f^2$ is almost zero in case (i), equation (14) is expressed by approximation using equation (16) below:

$$\sigma = \beta^2 \cdot \delta \tag{16}$$

In this manner, substitution of $a = \beta^2$ in equation (16) and using equation (16) in the same manner as equation (1) above yields equation (10).

On the other hand, equation (14) above is expressed by equation (17) below using the relationship given by equation (15):

$$\sigma = \delta \cdot (1 - \beta f^{-2})(f/f')^2 \tag{17}$$

Therefore, when $1/\beta f^2$ is almost zero in case (ii), i.e., when $\beta f^{-2} = 0$ can be assumed, equation (17) is expressed by approximation using equation (18) below:

$$\sigma = \delta \cdot (f/f')^2 \tag{18}$$

In this manner, substitution of $a = (f/f')^2$ in equation (18) and using equation (18) in the same manner as equation (1) above yields equation (10).

Note that the moving amount, upon zooming, of a lens unit, which monotonously moves in one direction upon zooming and from the moving amount of which the focal length is uniquely determined, is preferably used as $\Delta$ independently of the focusing method to be used. Especially, when $1/\beta f^2$ is almost zero in case (ii), the synthesized focal length f' of the lens units disposed on the object side of the focusing lens unit is preferably uniquely determined based on the moving amount $\Delta$ upon zooming.

As described above, the back focus adjustment method according to the present invention can be applied without being limited to any peculiar focusing method, and can adjust any deviation of the focal point position with a small storage capacity.

In the above discussion, the moving amount $\Delta$, upon zooming, of one of lens units constituting a zoom lens system is used as the focus length information. However, if another amount is given which changes upon zooming and which uniquely determines the focus length, like the rotation angle of a lens barrel, such an amount can be used as the focal length information in the adjustment method of the present invention.

Since the focusing lens unit is continuously movable and easy adjustment is attained by electrical control, the method of adjusting the back focus by moving the focusing lens unit by the adjustment amount δh has been discussed. However, the adjustment method of the present invention can be applied to any other lens units Gh other than the focusing lens unit as long as they are continuously movable and allow electrical adjustment.

In the present invention, during the manufacturing process, correction coefficients used in the formula are obtained on the basis of adjustment amounts δh in at least three lens position states within the zooming range. These correction coefficients are stored in a storage medium, and a lens unit Gh is driven by the adjustment amount δh for each focal length state obtained by substituting the focal length information in the formula. In this manner, any deviation between the focal point position and the film surface position can be eliminated over the entire zooming range.

From another viewpoint, a photographing lens is required to have at least a predetermined number of resolvable lines. A focal depth that meets the requirement of the number of resolvable lines may be considered.

For example, the resolution of human eye is normally considered to be θ=1' (minute). Upon enlarging an image to a service size, the enlarging magnification, β, becomes about three times. Assuming that this picture is observed at a distance L (250 mm) of distinct vision, the resolving power, K, on the film surface is expressed by equation (19) below:

$$K = \theta \cdot L = \{2\pi L/(360 \cdot 60)\}/\beta \quad (19)$$
$$= 0.02424 \text{ [mm]}$$

Therefore, the number of resolvable lines, k, required for observation is given by equation (20) below:

$$k=1/K=41.25 \text{ [lines/mm]} \quad (20)$$

If the aperture ratio at that time is represented by FNO, the focal depth, S, in the optical axis direction is given by equation (21) below:

$$S=\pm K \cdot FNO=\pm 0.02424 \cdot FNO \quad (21)$$

Therefore, even when the focal point position deviates within this focal depth S with respect to the film surface position, this deviation is not observed as an out-of-focus state.

The focal depth based on the above discussion does not allow an out-of-focus state but is associated with the focal point position precision of a camera. The required focal depth changes depending on the film surface size and the enlarging magnification. Furthermore, since an out-of-focus state largely depends on the subjective decision of an observer, the distance of distinct vision, the number of resolvable lines, and the like subjectively change. For this reason, the above-mentioned numerical values are merely a non-restrictive example of numerical values.

As described above, in consideration of the focal depth based on the specification of a camera, a slight deviation of the focal point position can be ignored. For this reason, even when a polynomial having a degree smaller than the number of movable lens units, N, is used in equation (10) above, the focal point position can be sufficiently controlled.

As will be described in the following embodiments, focusing can be attained by moving the focusing lens unit by a focusing moving amount, which is calculated by calculation means and stored in advance in a camera body, on the basis of focal length information and photographing distance information. The focusing lens unit need not be fixed during zooming. For example, another calculation means may be arranged to calculate a moving amount for zooming on the basis of focal length information, and the focusing lens unit may be moved by the calculated zooming moving amount.

The above and other objects, features and advantages of the present invention will be explained hereinafter and may be better understood by reference to the drawings and the descriptive matter which follows.

DETAILED DESCRIPTION OF THE PREFERRED EMBODIMENTS

The preferred embodiments of the present invention will be described hereinafter with reference to the accompanying drawings.

[First Embodiment]

Figure 1:
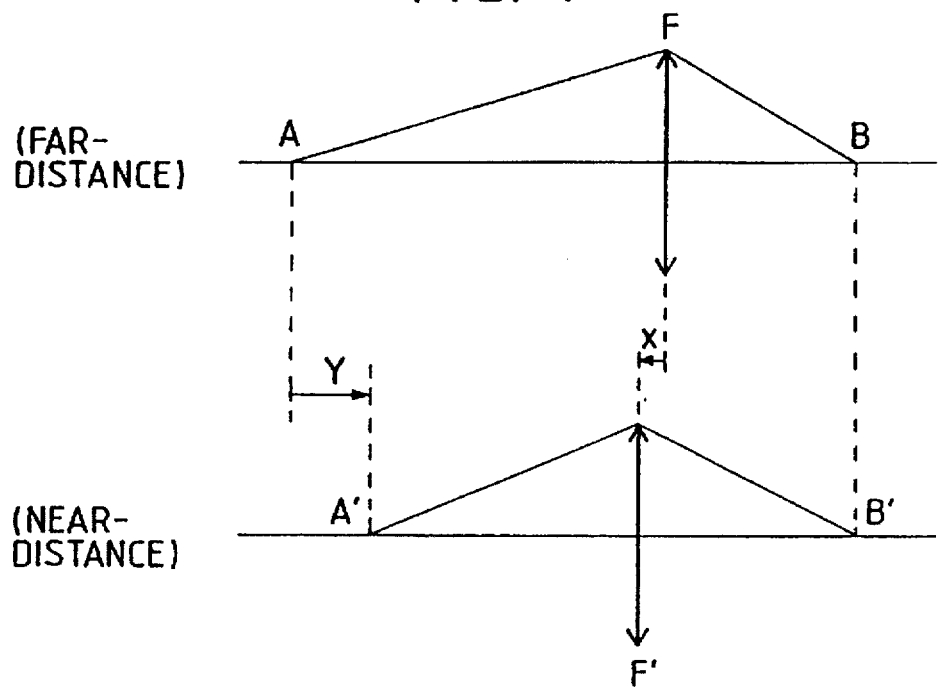
FIG. 1 is a view for explaining a condition for reducing the moving amount of a focusing lens unit with reference to a low-profile lens system.
Figure 2:
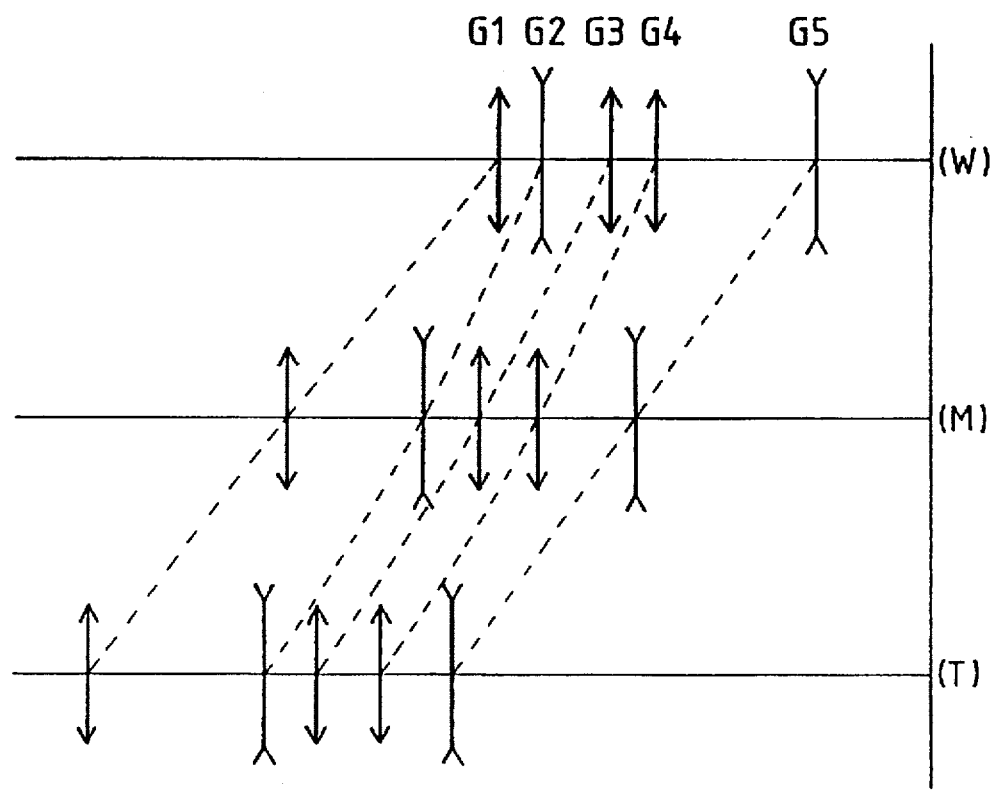
FIG. 2 is a view showing the refracting power layout at the wide-angle end (W), in a middle focal length state (M), and at the telephoto end (T) of a zoom lens system to which a focal point position correction apparatus according to the first and second embodiments of the present invention is applied.

FIG. 2 shows the refracting power layout at the wide-angle end (W), in a middle focal length state (M), and at the telephoto end (T) of a zoom lens system to which a focal point position correction apparatus according to the first and second embodiments of the present invention is applied.

A zoom lens system shown in FIG. 2 comprises, in the following order from the object side, a first lens unit G1 of a positive refractive power, a second lens unit G2 of a negative refractive power, a third lens unit G3 of a positive refractive power, a fourth lens unit G4 of a positive refractive power, and a fifth lens unit G5 of a negative refractive power.

Upon zooming from the wide-angle end to the telephoto end, the respective lens units move toward the object side so that the air gap between the first and second lens units G1 and G2 increases, the air gap between the second and third lens units G2 and G3 decreases, the air gap between the third and fourth lens units G3 and G4 increases, and the air gap between the fourth and fifth lens units G4 and G5 decreases.

Upon zooming, the second and fourth lens units G2 and G4 integrally move, and the third lens unit G3 moves relative to the second and fourth lens units G2 and G4. Upon focusing, only the third lens unit G3 moves along the optical axis.

Table 1 below summarizes the focal lengths of the respective lens units constituting the zoom lens system of the first embodiment. In Table 1, f1 is the focal length of the first lens unit G1, f2 is the focal length of the second lens unit G2, f3 is the focal length of the third lens unit G3, f4 is the focal length of the fourth lens unit G4, and f5 is the focal length of the fifth lens unit G5.

TABLE 1

| |
|---|
| f1 = +90.4309 |
| f2 = −23.5902 |
| f3 = +37.4505 |
| f4 = +37.6037 |
| f5 = −28.1980 |

Table 2 below shows the focal length f, corresponding to the moving amount, $\Delta$, upon zooming, of the first lens unit G1, as a representative lens unit in the zoom lens system of the first embodiment, from a position at the wide-angle end, the principal point interval between each two lens units, and the back focus Bf. In Table 2, D1 is the principal point interval between the first and second lens units G1 and G2, D2 is the principal point interval between the second and third lens units G2 and G3, D3 is the principal point interval between the third and fourth lens units G3 and G4, and D4 is the principal point interval between the fourth and fifth lens units G4 and G5. Note that a positive moving amount $\Delta$ of the first lens unit G1 upon zooming defines a movement toward the object side as a positive movement.

TABLE 2

| Δ | f | D1 | D2 | D3 | D4 | Bf |
|---|---|---|---|---|---|---|
| 0.000 | 39.0006 | 5.4997 | 8.5592 | 10.4519 | 27.6772 | 8.7659 |
| 8.586 | 49.8831 | 10.9106 | 8.1634 | 10.8477 | 23.9376 | 15.6807 |
| 17.254 | 62.7864 | 14.1629 | 7.7675 | 11.2436 | 20.8345 | 24.1998 |
| 25.923 | 75.8719 | 17.1959 | 7.3716 | 11.4395 | 18.6980 | 31.9714 |
| 34.591 | 89.6179 | 20.1471 | 6.9757 | 12.0354 | 17.0385 | 39.3479 |
| 43.259 | 104.3112 | 23.0378 | 6.5799 | 12.4312 | 15.6450 | 46.5189 |
| 51.927 | 119.9336 | 24.8089 | 6.1840 | 12.8271 | 14.5165 | 54.5446 |
| 60.595 | 136.2186 | 26.2328 | 5.7881 | 13.2230 | 13.6042 | 62.7012 |
| 69.377 | 154.0379 | 28.4821 | 5.3922 | 13.6189 | 12.6740 | 70.1640 |

In the first embodiment, the focal length f is expressed by equation (22) below on the basis of the moving amount $\Delta$ of the first lens unit G1 upon zooming:

$$f = 30.89154 + 1.15333 \times \Delta + 0.018858 \times \Delta^2 - \quad (22)$$
$$0.486716 \times 10^{-3} \times \Delta^3 + 0.717131 \times 10^{-5} \times$$
$$\Delta^4 - 0.369461 \times 10^{-7} \times \Delta^5$$

Using equation (23) below, the adjustment amount $\delta h$ in each focal length state is calculated:

$$\delta h = a_0 + a_1\Delta + a_2\Delta^2 + \ldots + a_5\Delta^5 \quad (23)$$

where $a_0$ to $a_5$ are correction coefficients.

The actual back focus adjustment in the first embodiment will be described below.

In the first embodiment, in the manufacture, (i) the fifth lens unit G5 is moved so as to match the focal point position at the wide-angle end with that at the telephoto end. Then, (ii) nine adjustment amounts $\delta h$ of the third lens unit G3 required for adjusting the focal point position and the film surface in nine lens position states corresponding to the moving amounts $\Delta$ of the first lens unit G1 upon zooming from the wide-angle end to the telephoto end shown in Table 2 are measured. (iii) Six correction coefficients $a_0$, $a_1$, $a_2$, ..., $a_5$ calculated based on the nine adjustment amounts $\delta h$ obtained by the operation (ii) are stored in a memory of a camera. Finally, (iv) the entire camera lens system is moved, so that the focal point position matches the film surface position, thereby attaining back focus adjustment.

Figure 3:
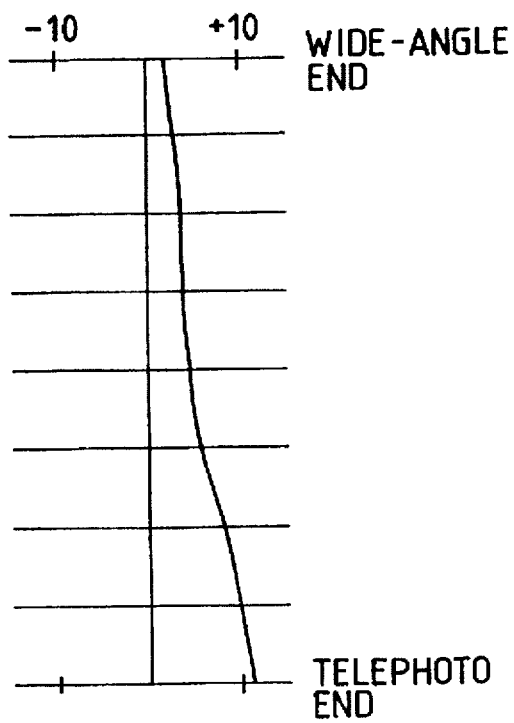
FIG. 3 is a view showing the deviation amount of the focal point position caused by manufacturing errors in the first embodiment.

The design focal lengths of the respective lens units in the first embodiment are as shown in Table 1 above. However, assume that the focal lengths of the respective lens units change by 3% in a direction to increase due to errors of the radii of curvature, lens thicknesses, refractive indices, and the like of respective lenses in the manufacture. Column (A) in Table 3 below and FIG. 3 show the deviation amounts of the focal point position in this case.

Figure 4:
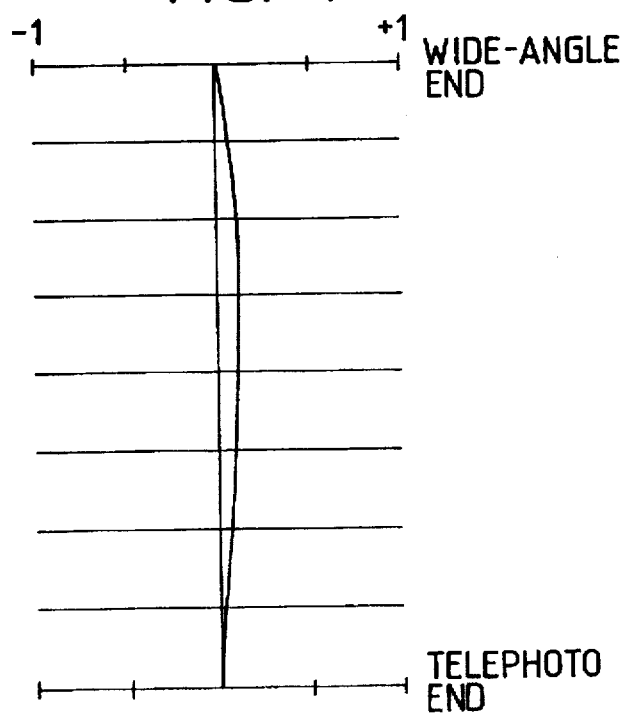
FIG. 4 is a view showing the deviation amount of the focal point position, which remains after the focal length at the wide-angle end is matched with that at the telephoto end in the first embodiment.

Column (B) in Table 3 and FIG. 4 show the deviation amounts of the focal point position after correction is performed by moving the fifth lens unit G5 so that the focal point position at the wide-angle end matches that at the telephoto end. In this case, the moving amount of the fifth lens unit G5 is 0.8131 toward the image side.

Figure 5:
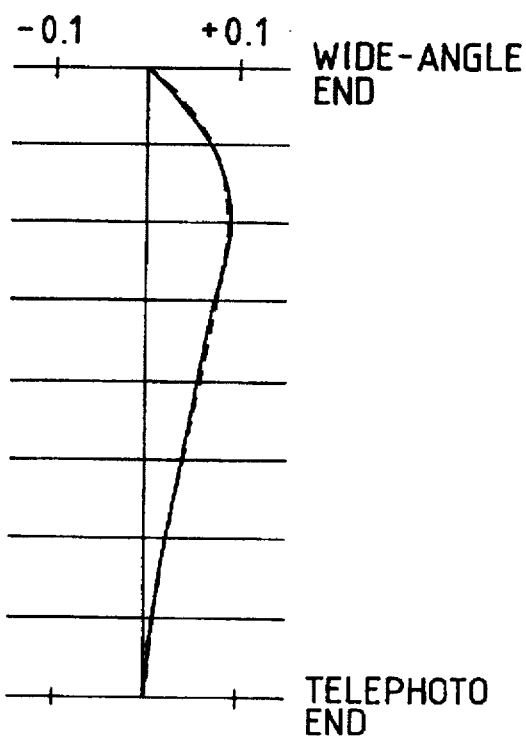
FIG. 5 is a view showing the adjustment amount required for correcting the deviation of the focal point position shown in FIG. 4.

Column (C) in Table 3 and a solid curve in FIG. 5 show the strict adjustment amounts required for correcting the deviation of the focal point position in the respective focal length states by moving the third lens unit G3 as the focusing lens unit. Furthermore, column (D) in Table 3 and a broken curve in FIG. 5 show the approximate adjustment amounts used for controlling the third lens unit G3 on the basis of the correction coefficients stored in the memory of the camera. Note that the actual values of the correction coefficients $a_0$, $a_1$, $a_2$, ..., $a_5$ stored in the memory are as follows:

$a_0=+0.0000$ $a_1=+0.12851\times10^{-1}$ $a_2=-0.65462\times10^{-3}$ $a_3=+0.14052\times10^{-4}$ $a_4=-0.15009\times10^{-6}$ $a_5=+0.64941\times10^{-9}$ In the first embodiment, the deviation amount between the focal point position and the film surface position after the deviation of the focal point position is corrected in the respective focal length states by moving the third lens unit G3 by the approximate adjustment amounts is 1.4707. Thus, the entire camera lens system is moved by 1.4707 toward the object side to match the focal point position with the film surface position, thereby completing the back focus adjustment.

TABLE 3

| Δ | (A) | (B) | (C) | (D) |
|---|---|---|---|---|
| 0.000 | 2.1387 | 0.0000 | 0.0000 | 0.0000 |
| 8.586 | 2.8594 | 0.1150 | 0.0662 | 0.0702 |
| 17.254 | 3.8363 | 0.2266 | 0.0935 | 0.0867 |
| 25.923 | 3.9908 | 0.2306 | 0.0740 | 0.0778 |
| 34.591 | 4.8019 | 0.2233 | 0.0584 | 0.0601 |
| 43.259 | 5.6719 | 0.1966 | 0.0433 | 0.0412 |
| 51.927 | 8.2628 | 0.1344 | 0.0244 | 0.0236 |
| 60.595 | 9.7495 | 0.0473 | 0.0071 | 0.0085 |
| 69.377 | 11.2949 | 0.0000 | 0.0000 | -0.0004 |

As described above, according to the first embodiment, approximate adjustment amounts can be satisfactorily obtained over the entire zooming range on the basis of the six correction coefficients $a_0$ to $a_5$ and the moving amount $\Delta$ of the first lens unit upon zooming. Then, the focal point position, i.e., the back focus, can be satisfactorily adjusted over the entire zooming range on the basis of the approximate adjustment amounts.

Figure 17:
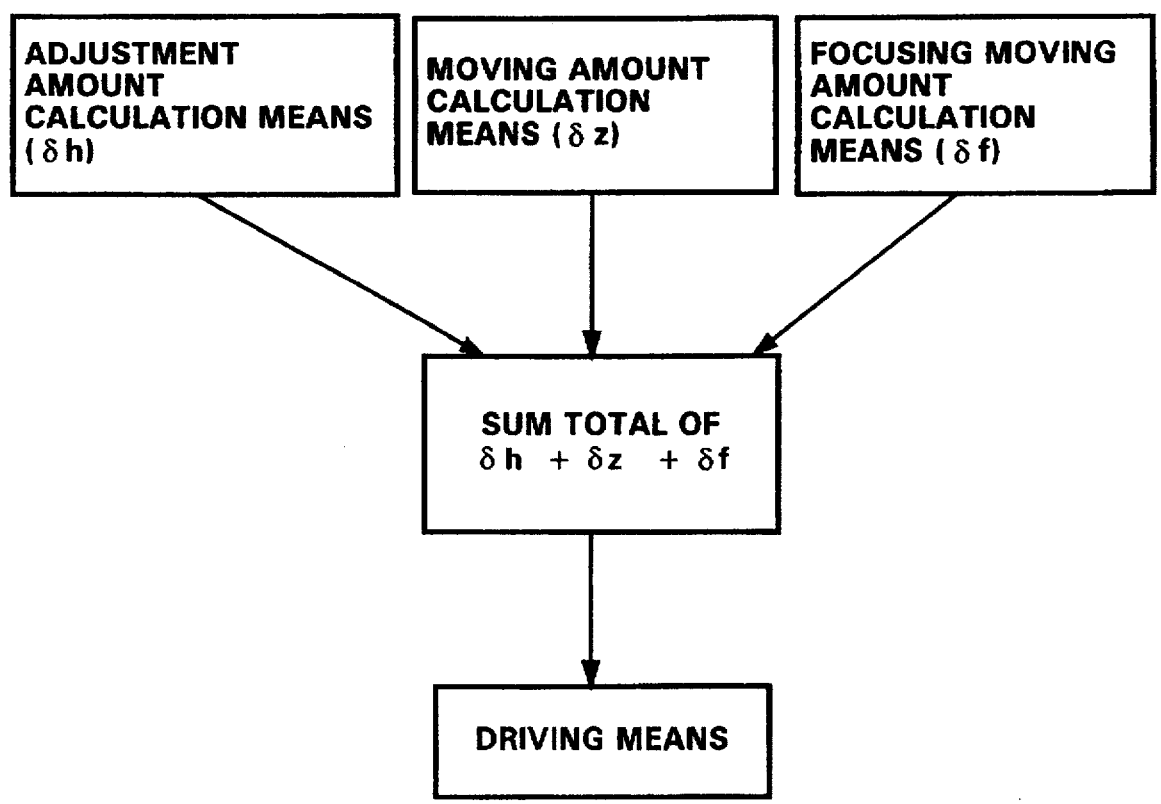
FIG. 17 is a block diagram of a embodiment of the present invention.

More specifically, according to the first embodiment, the adjustment amount calculation means calculates the approximate adjustment amounts $\delta h$ of the third lens unit G3 as the focusing lens unit using equation (23) based on the moving amount $\Delta$ of the first lens unit as the focal length information that defines the change amount corresponding to the focal length of the entire lens system, and the correction coefficients $a_0$ to $a_5$ pre-stored for the back focus adjustment. The driving means moves the third lens unit G3 by the calculated approximate adjustment amounts $\delta h$ along the optical axis, thereby satisfactorily correcting the deviation, of the focal point position with respect to the film surface as the best image surface, caused by manufacturing errors, over the entire zooming range. See FIG. 17.

In the first embodiment of the present invention, another calculation means calculates a moving amount $\delta z$ relative to the second and fourth lens units G2 and upon zooming of the third lens unit G3 on the basis of equation (24) below. The driving means controls the third lens unit G3 in accordance with the calculated moving amount $\delta z$. See FIG. 17.

$$\delta z = 3.1670 - 0.0458\Delta \quad (24)$$

Also, the focusing moving amount calculation means calculates a focusing moving amount $\delta f$ upon near-distance focusing of the third lens unit G3 on the basis of equation (25) or (26) below. The driving means controls the third lens unit G3 in accordance with the calculated moving amount $\delta f$. See FIG. 17.

$$\delta f = -(1.2395 + 0.0258\Delta)/R (\Delta \leq 25.9225 \text{ mm}) \quad (25)$$

$$\delta f = -(0.4789 + 0.0293\Delta)/R (\Delta > 25.9225 \text{ mm}) \quad (26)$$

where $\Delta$ is the moving amount of the first lens unit G1 upon zooming from a position at the wide-angle end, and R is the photographing distance. As described above, a positive moving amount $\Delta$ of the first lens unit G1 upon zooming defines a movement toward the object side. The same applies to the moving amounts $\delta z$ and $\delta f$.

In this manner, the total moving amount $\Delta_{G3}$ of the third lens unit G3 from the reference position is given by equation (27) below:

$$\Delta_{G3} = \delta z + \delta f + \delta h \quad (27)$$

As described above, the driving means controls the driving operation of the third lens unit in accordance with the total moving amount $\Delta_{G3}$ as the sum total of the moving amounts calculated by the respective calculation means on the basis of the focal length information $\Delta$ and the photographing distance R. See FIG. 17.

[Second Embodiment]

A zoom lens system of the second embodiment has the same refractive power layout as that of the first embodiment shown in FIG. 2. In the second embodiment, the focal lengths of respective lens units are the same as those in the first embodiment, i.e., are as shown in Table 1 above. The focal length f, the principal point interval between each two lens units, and the back focus Bf with respect to the moving amount $\Delta$ of the first lens unit G1 as a representative lens unit in the zoom lens system of the second embodiment, upon zooming from a position at the wide-angle end are the same as those in the first embodiment, i.e., are as shown in Table 2 above.

The actual back focus adjustment in the second embodiment will be explained below.

In the second embodiment, in the manufacture, (i) the fifth lens unit G5 is moved so as to match the focal point position with the film surface position at the telephoto end. Then, (ii) nine adjustment amounts $\delta h$ of the third lens unit G3 required for adjusting the focal point position and the film surface in nine lens position states corresponding to the moving amounts $\Delta$ of the first lens unit G1 upon zooming from the wide-angle end to the telephoto end shown in Table 2 are measured. (iii) Six correction coefficients $a_0$, $a_1$, $a_2$, ..., $a_5$ calculated based on the nine adjustment amounts $\delta h$ obtained by the operation (ii) are stored in a memory of a camera, thereby attaining back focus adjustment.

Figure 6:
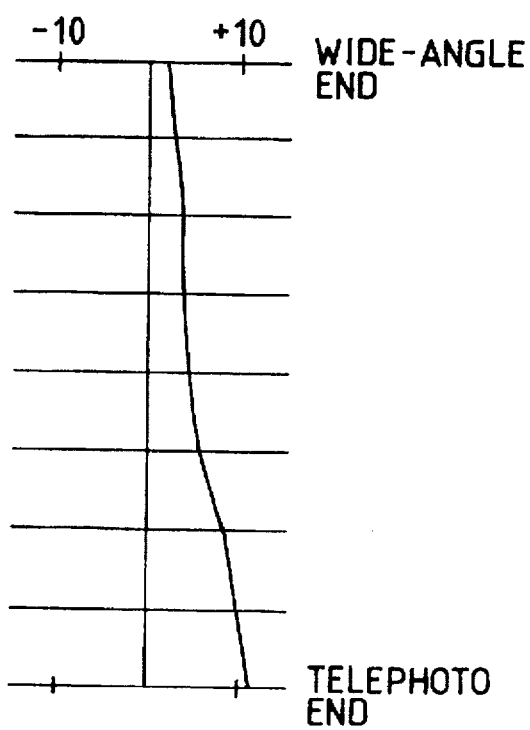
FIG. 6 is a view showing the deviation amount of the focal point position caused by manufacturing errors in the second embodiment.

The design focal lengths of the respective lens units in the second embodiment are as shown in Table 1 above. However, assume that the focal lengths of the respective lens units change by 3% in a direction to increase due to errors of the radii of curvature, lens thicknesses, refractive indices, and the like of respective lenses in the manufacture. Column (A) in Table 4 below and FIG. 6 show the deviation amounts of the focal point position in this case.

Figure 7:
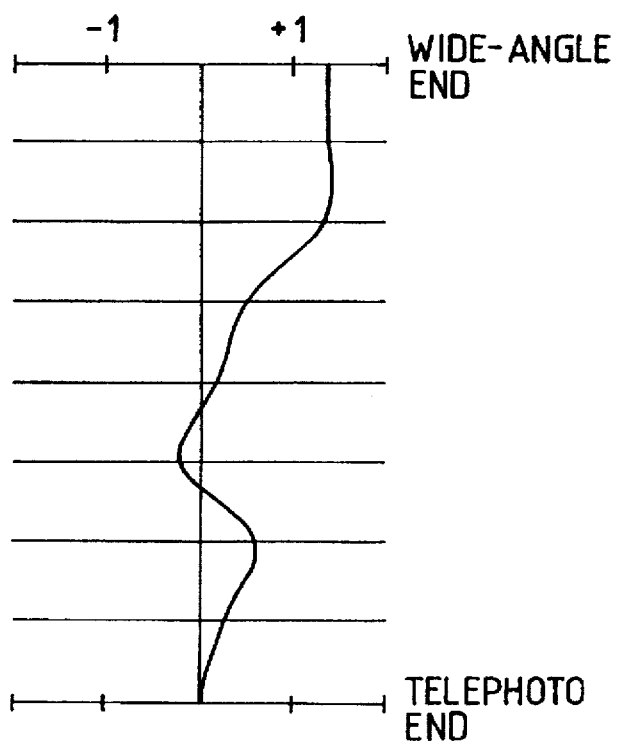
FIG. 7 is a view showing the deviation amount of the focal point position, which remains after the focal length at the wide-angle end is matched with that at the telephoto end in the second embodiment.

Column (B) in Table 4 and FIG. 7 show the deviations of the focal point position after correction is performed by moving the fifth lens unit G5 by 0.95142 toward the image side so that the focal point position overlaps the film surface at the telephoto end.

Figure 8:
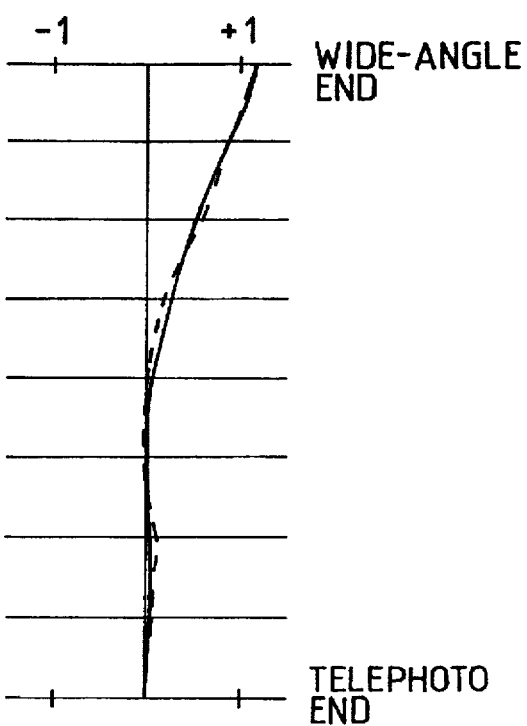
FIG. 8 is a view showing the adjustment amount required for correcting the deviation of the focal point position shown in FIG. 7.
Figure 9A:
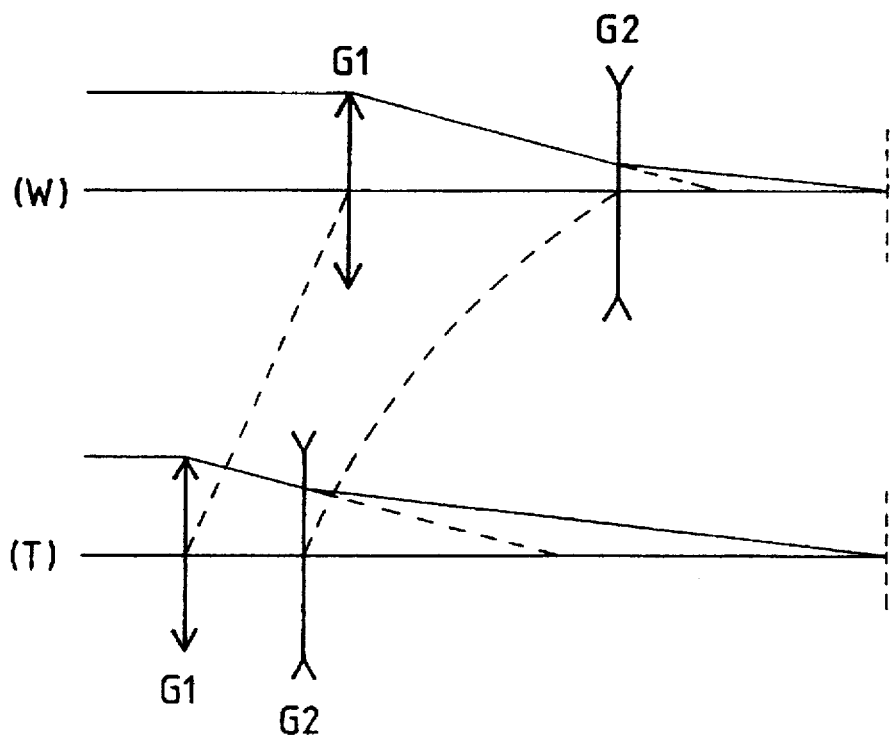
FIGS. 9A and 9B are views for explaining the deviation of the focal point position generated in the manufacture of a zoom lens system, using a low-profile lens system.
Figure 9B:
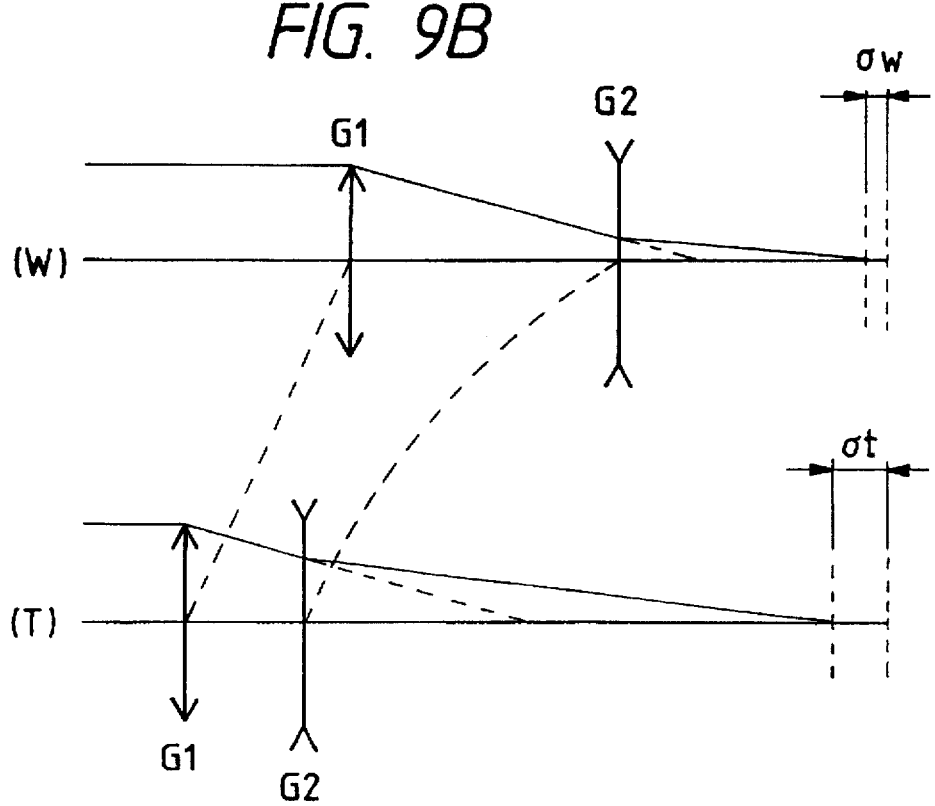
Figure 10A:
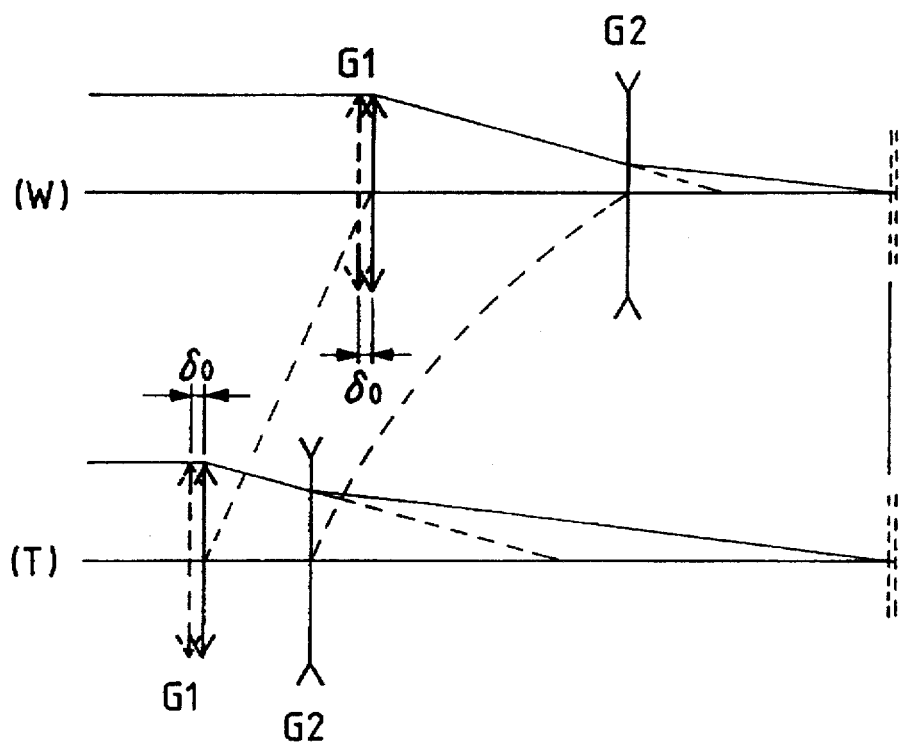
FIGS. 10A and 10B are views for explaining detailed operations for matching the focal point positions at the wide-angle and telephoto ends with the film surface.
Figure 10B:
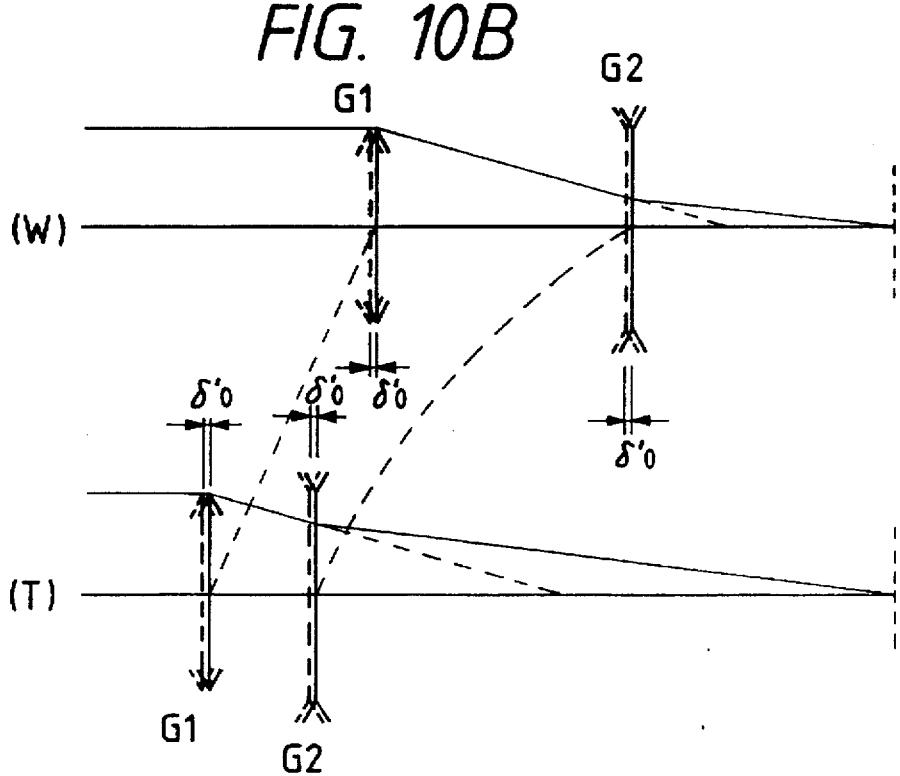
Figure 11:
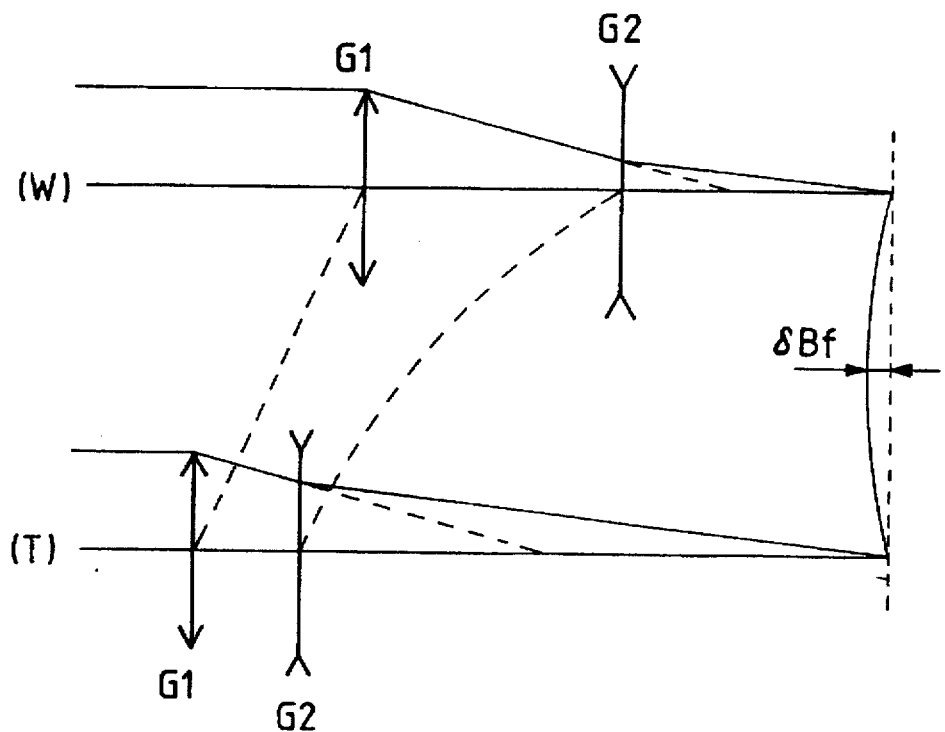
FIG. 11 is a view showing the relationship between the movements of respective lens units and the movement of the image surface position after back focus adjustment at the wide-angle and telephoto ends.
Figure 12:
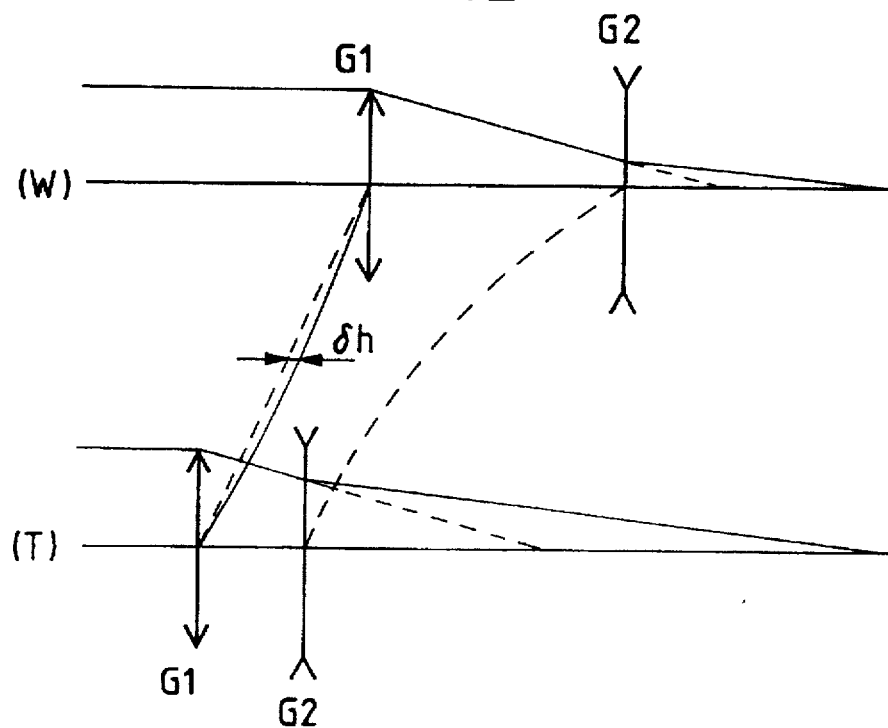
FIG. 12 is a view showing a change in adjustment amount δh upon zooming, which is required for correcting the deviation of the focal point position with respect to the film surface between the wide-angle and telephoto ends.
Figure 13:
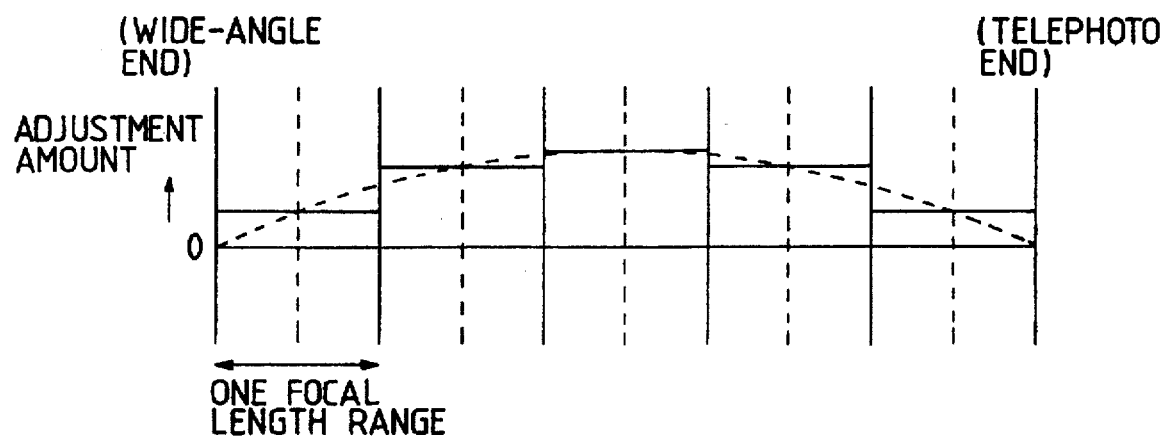
FIG. 13 is a graph for explaining the first conventional back focus adjustment method applied to a two-unit zoom lens system.
Figure 14:
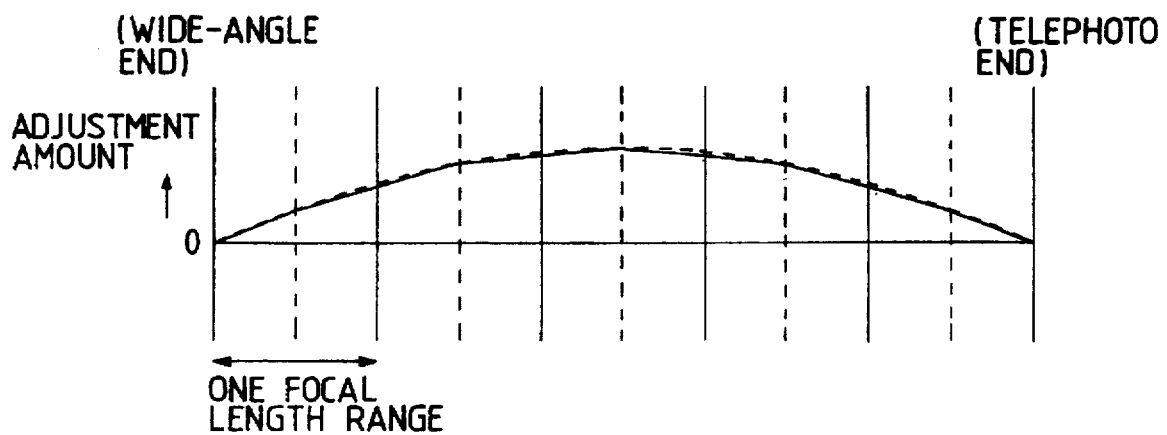
FIG. 14 is a graph for explaining the second conventional back focus adjustment method applied to a two-unit zoom lens system.
Figure 15:
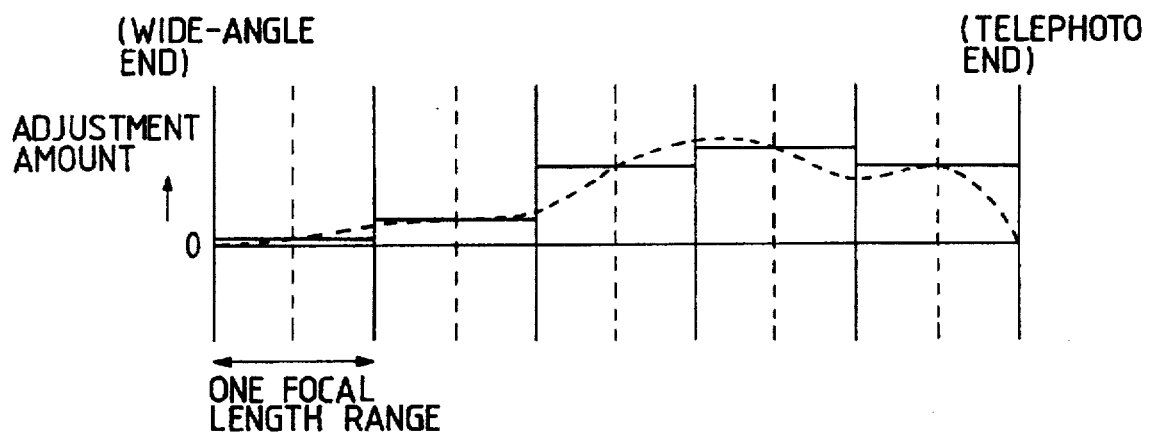
FIG. 15 is a graph for explaining the first conventional back focus adjustment method applied to a multi-unit zoom lens system.
Figure 16:
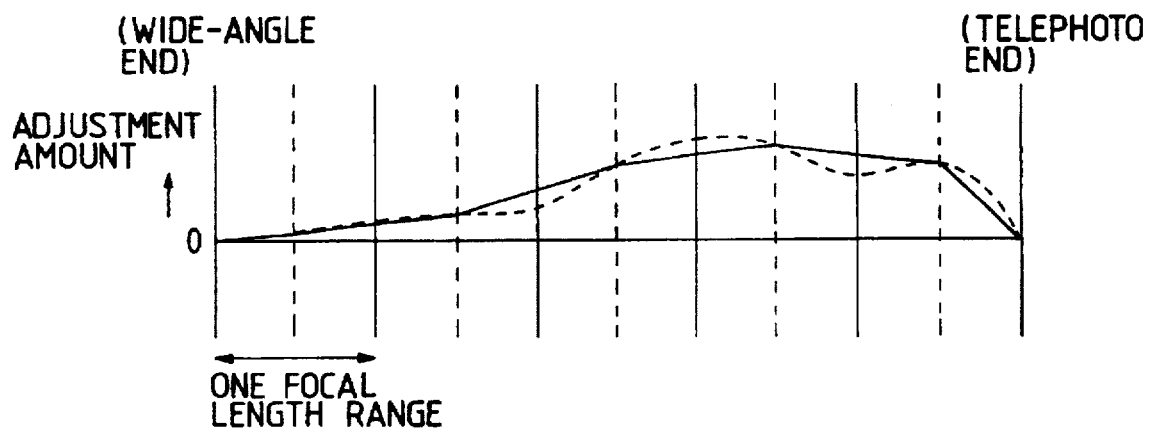
FIG. 16 is a graph for explaining the second conventional back focus adjustment method applied to a multi-unit zoom lens system.

Column (C) in Table 4 and a solid curve in FIG. 8 show the strict adjustment amounts used for correcting the deviation of the focal point position by moving the third lens unit G3. Furthermore, column (D) in Table 4 and a broken curve in FIG. 8 show the approximate adjustment amounts used for controlling the third lens unit G3 on the basis of the correction coefficients stored in the memory of the camera.

In the second embodiment, the actual values of the correction coefficients $a_0$, $a_1$, $a_2$, ..., $a_5$ stored in the memory are as follows:

$a_0 = +1.1682$
$a_1 = -0.14410 \times 10^{-1}$
$a_2 = -0.26889 \times 10^{-2}$
$a_3 = +0.96757 \times 10^{-4}$
$a_4 = -0.11407 \times 10^{-5}$
$a_5 = +0.42820 \times 10^{-8}$

TABLE 4

| Δ | (A) | (B) | (C) | (D) |
|---|---|---|---|---|
| 0.000 | 2.1387 | 1.3678 | 1.1682 | 1.1682 |
| 8.586 | 2.8594 | 1.3729 | 0.8607 | 0.9015 |
| 17.254 | 3.8363 | 1.3351 | 0.5859 | 0.5215 |
| 25.923 | 3.9908 | 0.5016 | 0.1711 | 0.2634 |
| 34.591 | 4.8019 | 0.1715 | 0.0475 | 0.0359 |
| 43.259 | 5.6719 | -0.1951 | -0.0454 | -0.0005 |
| 51.927 | 8.2628 | 0.5918 | 0.1116 | 0.0398 |
| 60.595 | 9.7495 | 0.2757 | 0.0249 | 0.0683 |
| 69.377 | 11.2949 | 0.0000 | 0.0000 | -0.0093 |

As described above, in the second embodiment as well, the approximate adjustment amounts can be satisfactorily obtained over the entire zooming range on the basis of the sixth correction coefficients $a_0$ to $a_5$ and the moving amount Δ of the first lens unit upon zooming.

Having described preferred embodiments of the present invention, it is to be understood that any variations will occur to those skilled in the art within the scope of the appended claims.

What is claimed is:

1. A focal point position correction apparatus for a camera with a zoom lens system, comprising: adjustment amount calculation means for calculating an adjustment amount δh of at least one lens unit Gh in the zoom lens system using a formula based on focal length information that defines a change amount corresponding to a focal length of the entire lens system and correction coefficients pre-stored for correcting a deviation of a focal point position with respect to a film surface of a best image surface, caused by manufacturing errors; and driving means for moving the lens unit Gh in accordance with the adjustment amount δh along an optical axis in respective focal length states so as to correct the deviation over an entire zooming range.

2. An apparatus according to claim 1, wherein the lens unit Gh has a variable use magnification, and is movable upon focusing.

3. An apparatus according to claim 1, wherein said adjustment amount calculation means calculates the adjustment amount δh using the following formula based on correction coefficients $a_0, a_1, a_2, \ldots, a_i$, and a moving amount Δ as the focal length information:

$$\delta h = a_0 + a_1\Delta + a_2\Delta^2 + \ldots a_i\Delta^i.$$

4. An apparatus according to claim 3, wherein the (i+1) correction coefficients are defined based on three adjustment amounts δh required for correcting the deviation of the focal point position with respect to the film surface of the best image surface in at least three focal length states.

5. An apparatus according to claim 4, wherein the (i+1) correction coefficients are defined based on the basis j (j>(i+1)) adjustment amounts δh required for correcting the deviation of the focal point position with respect to the film surface of the best image surface in j focal length states.

6. An apparatus according to claim 5, wherein the number of correction coefficients is smaller than the number of movable lens units constituting the zoom lens system.

7. An apparatus according to claim 6, wherein the lens unit Gh is a focusing lens unit which is movable upon focusing, said driving means comprises focusing moving amount calculation means for calculating a focusing moving amount δf of the lens unit Gh calculated based on photographing distance information for defining a distance to an object and the focal length information, and said driving means moves the lens unit Gh along the optical axis or accordance with a sum total of the focusing moving amount δf and the adjustment amount δh.

8. An apparatus according to claim 2, wherein said adjustment amount calculation means calculates the adjustment amount δh using the following formula based on correction coefficients $a_0, a_1, a_2, \ldots, a_i$, and a moving amount Δ as the focal length information:

$$\delta h = a_0 + a_1\Delta + a_2\Delta^2 + \ldots a_i\Delta^i.$$

9. An apparatus according to claim 8, wherein the (i+1) correction coefficients are defined based on three adjustment amounts δh required for correcting the deviation of the focal point position with respect to the film surface of the best image surface in at least three focal length states.

10. An apparatus according to claim 9, wherein the (i+1) correction coefficients are defined defined on j (j>(i+1)) adjustment amounts δh required for correcting the deviation of the focal point position with respect to the film surface of the best image surface in j focal length states.

11. An apparatus according to claim 10, wherein the number of correction coefficients is smaller than the number of movable lens units constituting the zoom lens system.

12. An apparatus according to claim 11, wherein the lens unit Gh is a focusing lens unit which is movable upon focusing, said driving means comprises focusing moving amount calculation means for calculating a focusing moving amount δf of the lens unit Gh calculated based on photographing distance information for defining a distance to an object and the focal length information, and said driving means moves the lens unit Gh along the optical axis in accordance with a sum total of the focusing moving amount δf and the adjustment amount δh.

* * * * *